(12) United States Patent
Alfermann

(10) Patent No.: US 10,119,461 B2
(45) Date of Patent: Nov. 6, 2018

(54) METHOD AND SYSTEM FOR FREEZING ALTERNATOR NODE ADDRESS

(71) Applicant: BorgWarner Inc., Auburn Hills, MI (US)

(72) Inventor: Timothy J. Alfermann, Carmel, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/602,543

(22) Filed: May 23, 2017

(65) Prior Publication Data

US 2017/0370281 A1    Dec. 28, 2017

Related U.S. Application Data

(60) Provisional application No. 62/355,558, filed on Jun. 28, 2016.

(51) Int. Cl.
| | |
|---|---|
| *F02B 63/04* | (2006.01) |
| *B60R 16/02* | (2006.01) |
| *B60R 16/033* | (2006.01) |
| *H02P 29/024* | (2016.01) |

(52) U.S. Cl.
CPC ........ *F02B 63/042* (2013.01); *B60R 16/0215* (2013.01); *B60R 16/033* (2013.01); *H02P 29/024* (2013.01)

(58) Field of Classification Search
CPC . F02B 63/042; B60R 16/0215; B60R 16/033; H02P 29/024; H02P 5/74; F02N 11/08; F02N 2200/00; F02N 2300/00; F02D 41/062; F02D 41/06; H02J 1/10; H02J 2007/143; H02J 3/46; H02J 7/1423; H02H 7/062; H02M 7/08; Y10T 307/576; Y10T 307/718
USPC .................... 60/624, 597; 318/720, 822, 93
See application file for complete search history.

(56) References Cited

U.S. PATENT DOCUMENTS

| | | | |
|---|---|---|---|
| 2,829,278 | A | 4/1958 | Flugstad |
| 5,252,926 | A | 10/1993 | Menegoli |
| 6,573,689 | B1 | 6/2003 | Renehan |
| 8,080,980 | B2 | 12/2011 | Harmon et al. |
| 8,102,145 | B2 | 1/2012 | Merrill et al. |

(Continued)

*Primary Examiner* — Thomas Moulis
*Assistant Examiner* — John Bailey
(74) *Attorney, Agent, or Firm* — Bose McKinney & Evans LLP

(57) ABSTRACT

A vehicle system including a plurality of alternators with a common electrical connection interface having at least one connector and a digital communication connector through which a processor communicates with the alternators. Input signals received at the at least one connector are unique for each alternator under normal and unimpaired operating conditions. Upon wakeup of an alternator, the alternator assesses the input signals and whether the address of the alternator is frozen. If the address is not frozen, the status of at least one operating parameter is assessed to determine if a predefined requirement is satisfied. If the predefined requirement is satisfied, the alternator is assigned an address based upon the input signals at the at least one connector and the address is frozen. The alternator can detect faults by determining if the input signals at the least one connector agree with the frozen address of the alternator.

15 Claims, 2 Drawing Sheets

(56) References Cited

U.S. PATENT DOCUMENTS

| | | | |
|---|---|---|---|
| 8,330,430 B2 | 12/2012 | Steele, Jr. et al. | |
| 2008/0290666 A1* | 11/2008 | Bourgeau | H02P 9/006 |
| | | | 290/40 A |
| 2009/0243559 A1 | 10/2009 | Bartol et al. | |
| 2012/0205986 A1* | 8/2012 | Frampton | H02J 3/381 |
| | | | 307/84 |
| 2012/0290151 A1* | 11/2012 | Bissontz | B60W 10/06 |
| | | | 701/2 |
| 2015/0027124 A1* | 1/2015 | Hartig | B60L 11/08 |
| | | | 60/702 |
| 2015/0069858 A1* | 3/2015 | Frampton | H02J 3/44 |
| | | | 307/127 |
| 2015/0236702 A1 | 8/2015 | Alfermann | |
| 2015/0236703 A1 | 8/2015 | Alfermann | |
| 2016/0006256 A1* | 1/2016 | Muller | G05B 19/0425 |
| | | | 307/84 |
| 2016/0094036 A1* | 3/2016 | Alfermann | H02J 13/00 |
| | | | 307/44 |

* cited by examiner

METHOD AND SYSTEM FOR FREEZING ALTERNATOR NODE ADDRESS

This application claims priority under 35 U.S.C. 119(e) of U.S. provisional patent application Ser. No. 62/355,558 filed on Jun. 28, 2016 entitled METHOD AND SYSTEM FOR FREEZING ALTERNATOR NODE ADDRESS the disclosure of which is hereby incorporated herein by reference.

BACKGROUND

The present invention relates to alternators and vehicle charging and communication systems.

Many vehicles have more than one alternator that is used to convert mechanical energy to electrical energy. For example, vehicles such as trucks, buses and commercial vehicles often include multiple alternators. Lighter vehicles may also employ multiple alternators.

When multiple alternators are employed in a single vehicle, they often have the same construction. Modern vehicles typically include a communication network which allows communication between the multiple alternators and a vehicle controller.

When employing multiple alternators it is useful for the controller to be able to identify each of the separate alternators. This is particularly true for diagnostic messages which communicate a fault or error in one of the alternators. One issue that makes identifying each of the separate alternators problematic is that electrical connections with the alternator can be subject to significant temperature variations and vibrations. These conditions can cause such connections to fail intermittently or completely.

A robust system and method that enables the vehicle controller to identify each of a plurality of alternators is desirable.

SUMMARY

The present invention provides a robust method and system for freezing the node address of an alternator which is resistant to intermittent connections during operation and facilitates accurate diagnostic feedback.

The invention comprises, in one form thereof, a vehicle charging system for use with a vehicle having an internal combustion engine. The system includes a plurality of alternators wherein each of the alternators is operably coupled with the engine and the electrical system and each of the alternators are operable to convert mechanical energy from the engine to electrical current which is output to the vehicle charging system. Each of the plurality of alternators have a common electrical connection interface that includes at least one connector and a digital communication connection. A processor is operably coupled with the plurality of alternators through a communication line operably coupled with the digital communication connection of each of the plurality of alternators. The at least one connector of each of the plurality of alternators is operably coupled with the vehicle wherein input signals for each of the at least one connector for each of the plurality of alternators are unique for each one of the plurality of alternators under normal and unimpaired operating conditions whereby a unique address is assignable to each of the plurality of alternators based upon the status of the input signals received by the plurality of alternators on the at least one connectors. At least one sensor is operably coupled with the vehicle for sensing at least one operating parameter of the vehicle. The processor and the plurality of alternators are configured such that, upon wakeup of an alternator, the alternator assesses the status of the input signals from the at least one connector and whether the address of the alternator is frozen. When the address of the alternator is not frozen upon wakeup, the status of the at least one operating parameter is assessed to determine whether a predefined requirement is satisfied, when the predefined requirement is satisfied, the alternator is assigned an address based upon the input signals at the at least one connector and the address is frozen.

In such a vehicle charging system, each of the alternators may advantageously have a common design.

In some embodiments, the at least one operating parameter includes a parameter that varies with the rotational speed of alternator. For example, the at least one operating parameter that varies with the rotational speed of the alternator may be the frequency of the phase voltage generated by the alternator. Alternatively, the at least one operating parameter that varies with the rotational speed of the alternator may be the rotational speed of the alternator.

In some embodiments, including those wherein the at least one operating parameter includes a parameter that varies with the rotational speed of the alternator, the vehicle includes an ignition switch having at least three positions that include an off position, a start position and an on position and the predefined requirement requires that the ignition switch be in the on position.

In some embodiments, the predefined requirement requires that the voltage generated by the alternator remain within a predefined range for a predefined time period. In such an embodiment, the vehicle may include an ignition switch having at least three positions that include an off position, a start position and an on position and the predefined requirement additionally requires that the ignition switch be in the on position.

In some embodiments, each of the at least one connectors define a high impedance node.

In some embodiments, one of the connectors of at least one alternator is in communication with a line extending between the at least one alternator and a vehicle battery.

In some embodiments, one connectors of at least one alternator is in communication with a line extending between the at least one alternator and a vehicle ground.

In some embodiments wherein each of the alternators includes first and second connectors, one of the first and second connectors of at least one alternator is in communication with a line extending between the at least one alternator and a vehicle battery; and one of the first and second connectors of at least one of the alternators is operably coupled with a line extending between the at least one alternator and a vehicle ground.

In some embodiments, the processor and the plurality of alternators are configured such that, when assessment of the status of the at least one operating parameter determines that the predefined requirement is not satisfied, the alternator is assigned an unfrozen address based upon the input signals at the at least one connector and then continues to repeat the process for assessing the status of the at least one operating parameter and assigning either a frozen or unfrozen address to the alternator until the alternator is assigned a frozen address or the alternator enters a sleep condition.

In such an embodiment, the alternator may assign an unfrozen address to the alternator after determining that the status of the at least one operating parameter does not satisfy the predefined requirement. It may also determine the fault status of the at least one connector by determining whether the at least one connector is receiving signals in agreement with the unfrozen address of the alternator and communicate the fault status to the processor.

In some embodiments, including those which continue to repeat the process for assessing the status of the at least one operating parameter until the address is frozen or the alternator enters a sleep mode, when the address of the alternator is frozen, the alternator may periodically determine the fault status of the at least one connector by determining whether the at least one connector is receiving signals in agreement with the frozen address of the alternator.

In embodiments wherein, when the address of the alternator is frozen, the alternator periodically determines the fault status of the at least one connector by determining whether the at least one connector is receiving signals in agreement with the frozen address of the alternator, the alternator may periodically communicate the fault status of the at least one connector to the processor when the alternator has a frozen address.

In the various embodiments of a vehicle charging system described above, the at least one connector may advantageously take the form of at least a first connector and a second connector.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
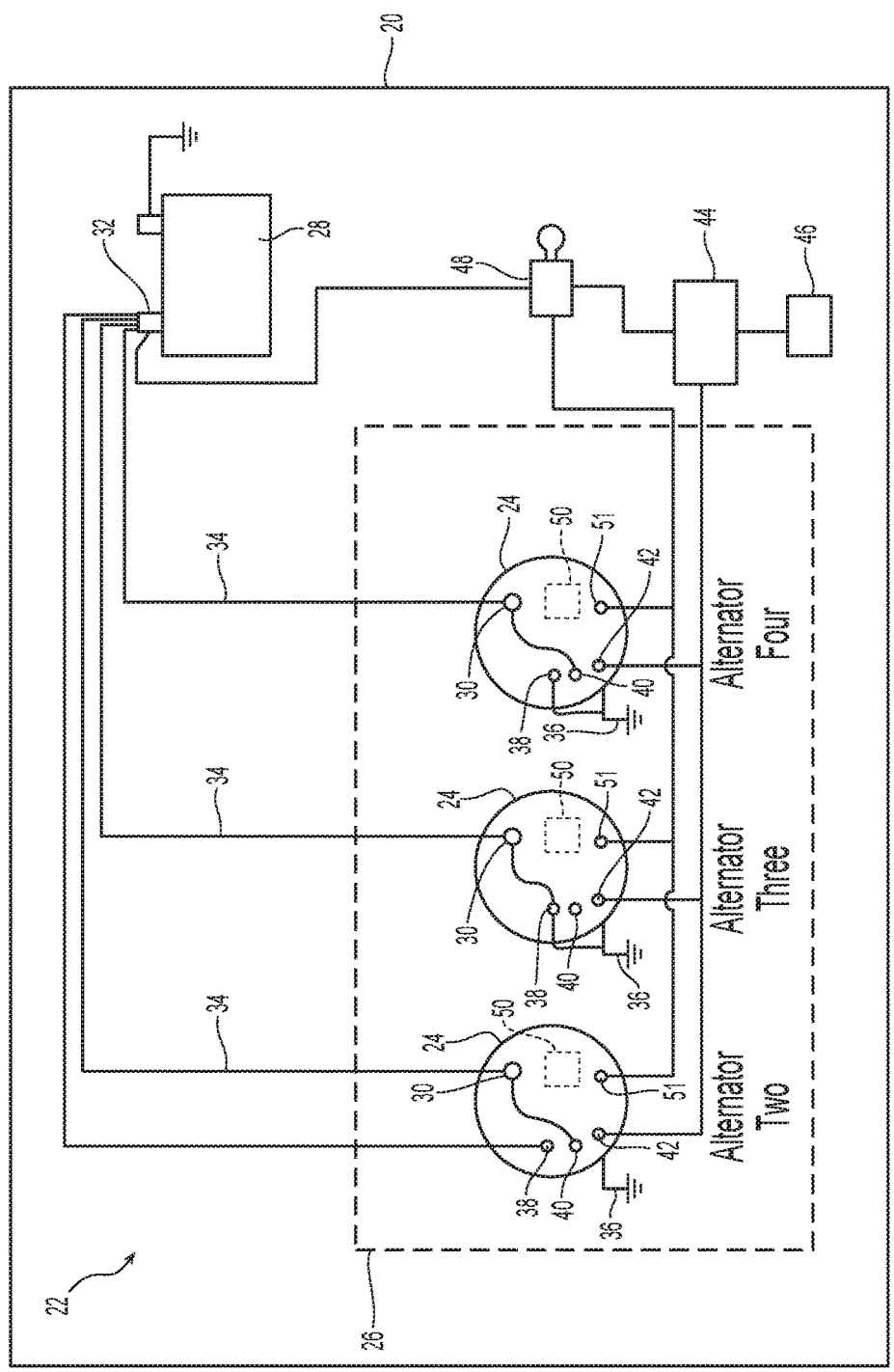
FIG. 1 is a schematic diagram of a vehicle having a plurality of alternators.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

FIG. 1 schematically depicts a vehicle 20 having a charging system 22 that includes a plurality of alternators 24. An internal combustion engine 26 provides the mechanical torque to drive the alternators 24. Alternators 24 generate electrical current which is output to the charging system 22 and thereby recharges battery 28. In the illustrated example, vehicle 20 includes three alternators 24. Battery 28 is shown as a single battery but may take the form of a bank of batteries. While vehicles having a plurality of alternators are most commonly trucks, buses and other large and/or commercial vehicles, it may also be desirable in some applications to employ a plurality of alternators with smaller vehicles such as passenger automobiles.

In the illustrated example, each alternator 24 has the same design. Using alternators having a common design provides efficiencies in the manufacture and maintenance of vehicle 20.

Each of the alternators 24 includes a B+ terminal 30 which is connected to the positive terminal 32 of battery 28 with an electrically conductive cable 34 to thereby provide for recharging battery 28. Each of the alternators 24 also includes a grounding cable 36 for grounding the alternator. For example, grounding cables 36 may provide electrical communication between the case or housing of each alternator 24 and the vehicle chassis to thereby ground the alternators. Each alternator 24 also includes connectors 38, 40, 42, 51 for communicating electrical signals.

The first connectors 38 are also referred to herein as "A" connectors while the second connectors 40 are also referred to herein as "B" connectors. The A and B connectors are high impedance nodes that allow for three state logic as further discussed below. The third set of connectors 42 are communication nodes that provide a connection to the digital communication network 44 of vehicle 20. Connectors 42 thereby provide for digital communication between alternators 24 and a processor 46 which is also in communication with digital communication network 44. Processor 46 may be the primary electronic control unit for vehicle 20 or an auxiliary processor and may be located wherever suitable in vehicle 20.

In the illustrated embodiment, alternators 24 includes a sensor in the form of a sensing circuit 50 that is part of an electronic voltage regulator and is used to sense the phase voltage being generated by the alternator. The voltage of an individual phase will have a sinusoidal pattern. Thus, by sensing the voltage of an individual phase, the rotational speed of the alternator and the frequency of the phase voltage can be determined.

Also shown in FIG. 1 is the ignition switch 48 of vehicle 20. Conventional ignition switches conventionally include at least four positions, i.e., off, accessories, on, and start. Ignition switch 48 includes at least an off, on, and start position. Ignition switch 48 is coupled to the alternators via connectors 51.

As can be seen in FIG. 1, the A and B connectors of each of the three alternators 24 are each connected in a unique manner. As more fully explained below, this allows each of the alternators to be uniquely identified whereby each alternator may utilize a unique address for digital communications based upon the unique connections at the A and B connectors.

Each of the A and B connectors of the alternators 24 depicted in FIG. 1 are connected to either a line that generates either a relatively high voltage signal or a low voltage signal when vehicle 20 is operating normally and the electrical circuits generating the signals to the A and B connectors are unimpaired. In FIG. 1, alternator "two" has a connector A that is coupled with a high voltage line and a B connector coupled that is also coupled with a high voltage line. More specifically, for alternator "two", connector A is coupled to a line that senses the voltage of battery 28 while connector B is coupled to a line 34 that extends between the alternator and the battery at the B+ terminal 30 of the alternator. It is noted that the connection for connector A of alternator "two" is similar to that of a conventional remote sense connection (terminal S) of a conventional alternator that is used to sense the voltage at the battery.

Alternator "three" of FIG. 1 has a connector A that is coupled to a line 34 that extends between the alternator and the battery at the B+ terminal 30 of the alternator and thereby receives a high voltage signal. Connector B of alternator "three" is grounded and thereby receives a low voltage signal. The grounding of connector B may be accomplished by coupling it with grounding cable 36 either directly or indirectly by a connection with the case of the alternator or by an independent grounding cable to the vehicle chassis or other grounding structure or connection.

The connections for alternator "four" of FIG. 1 reverses the connections of connectors A and B so that connector A receives a low voltage input and connector B receives a high voltage input.

It is noted that vehicle 20 includes only three alternators and none of the three alternators is listed as alternator "one". This is best understood with reference to Table 1 presented below which sets for the naming/numbering protocol for the alternators in the illustrated embodiment.

TABLE 1

| Alternator Number | Connector A | Connector B |
|---|---|---|
| one | Either A or B input is float | Either A or B input is float |
| two | 1 | 1 |
| three | 1 | 0 |
| four | 0 | 1 |
| five | 0 | 0 |

In this logic table, 1 represents a high voltage input signal, 0 represents a low voltage input signal and float represents the condition where the connector is not connected to an external circuit or the line making the connection has a break. Turning now to the number or address that will be assigned to the alternator based upon the inputs at connectors A and B, if either connector A or connector B is in a float condition, the alternator will be assigned the address of "one". The address "two" will be assigned to the alternator if both connector A and connector B receive high voltage input signals. The address "three" will be assigned if connector A receives a high voltage input signal and connector B receives a low voltage input signal. Table 1 also sets for the conditions for addressing an alternator "four" or "five". If a larger number of alternators are employed and the use of only two connectors will not provide for a sufficient number of unique connections, a larger number of connectors can be employed.

Similarly, it is also possible to use only a single connector A or B to provide each one of a plurality of alternators with a unique address. For example, in a one connector arrangement, one alternator could be connected to receive a low voltage input signal at the sole connector, a second alternator could be connected to receive a high voltage input signal at the sole connector and a third alternator (if the vehicle included a third alternator) could be connected to receive a floating input signal at the sole connector.

In the illustrated example, processor 46 and alternators 24 are configured so that during operation of vehicle 20, alternators 24 are assigned an address that is based upon the manner in which connectors A and B are connected. This allows the use of alternators 24 having a common design that may be installed in any one of the three different alternator positions and still be uniquely identified by processor 46. This facilitates efficient communication between processor 46 and alternators 24 by providing each alternator with a unique address. Furthermore, if one of the alternators suffers a malfunction, this method of providing unique addresses to each alternator will often be possible to generate a fault report that identifies which alternator has suffered the malfunction and thereby facilitate the efficient repair of the vehicle. As further discussed below, it can also provide certain diagnostic information concerning the lines connected to the alternators.

When assigning an address to the alternator, the address may be either frozen (locked) or unfrozen (unlocked) wherein for a frozen address, the alternator will not alter the address even if the input signals received at the A and B connectors are not in agreement with the address. If the address is unfrozen (or unlocked) it will be possible, under at least some circumstances, for the address of the alternator to change.

During operation, processor 46 periodically requests each alternator 24 to identify itself and provide certain information. In the illustrated embodiment, such periodic requests include requests to provide information on the fault status of connectors A and B.

Processor 46 and alternators 24 may utilize the Local Interconnect Network ("LIN") serial network protocol for communication. LIN is a standardized communication protocol that is commonly used in the digital networks of vehicles.

During operation, the alternators 24 may be requested to send a message updating the fault status of the alternator's A and B connectors before the address of the alternator has been frozen. Table 2 presents the various possible inputs for connectors A and B of an individual alternator that has an unfrozen/unlocked address and the address of the alternator and the fault status of the A and B connector that the alternator would use when generating a message replying to the processor's request for the fault status of the alternator.

In this table, the address column presents the address that the alternator would assign itself based upon the inputs received at the A and B connectors. In this regard, it is noted that 1 represents a high voltage input signal; 0 represents a low voltage input signal; and float represents the connector being in a floating or unconnected condition.

With regard to the fault status of the A and B connectors, 0 represents a no fault condition and 1 represents a fault condition. As can be seen in Table 2, for an alternator with an unfrozen address, any connector input that results in a float condition results in an address of "one" and a fault condition for the connector that has the float condition.

As mentioned above, the three alternators in the illustrated embodiment are connected so that, if every connection is working properly, the alternator addresses will be two, three and four and none of the three alternators 24 will have an address of one. Thus, if an alternator reports that its address is one, this means that, at the alternator "one", either the connection to the A or B connector has failed or there is a break in the line to which the A or B connector is coupled. If all of the other alternators are functioning properly and assigned themselves their proper address, it will also be possible to identify which alternator has assigned itself the address of "one" by the process of elimination. For example, if the three alternators report their addresses as one, two and four, it is alternator three that has the fault and which is reporting its address as one.

TABLE 2

Unfrozen/Unlocked Message Matrix

| Address Status | A Connector Input | B Connector Input | Address | A Fault Status | B Fault Status |
|---|---|---|---|---|---|
| Unlocked | 1 | Float | One | 0 | 1 |
| Unlocked | 1 | 0 | Three | 0 | 0 |
| Unlocked | 1 | 1 | Two | 0 | 0 |
| Unlocked | 0 | Float | One | 0 | 1 |
| Unlocked | 0 | 0 | Five | 0 | 0 |
| Unlocked | 0 | 1 | Four | 0 | 0 |
| Unlocked | Float | Float | One | 1 | 1 |
| Unlocked | Float | 0 | One | 1 | 0 |
| Unlocked | Float | 1 | One | 1 | 0 |

Table 3 presented below is similar to Table 2 but is specifically for an alternator that has a frozen/locked address of "two". To generate an address of "two" using the logic of Table 1, both the A and B connector would have a high voltage input. Because the address is frozen, the alternator will report its address as "two" even when the inputs at A and B do not agree with this address. As can also be seen in Table 3, if the inputs do not agree with the inputs that would generate the frozen address, the alternator will report that the connector which has an input signal that does not agree with the frozen/locked address as being in a fault condition. This report can facilitate the efficient repair of the issue that is responsible for the generation of the fault condition.

TABLE 3

Frozen/Locked Message Matrix

| Address Status | A Connector Input | B Connector Input | Address | A Fault Status | B Fault Status |
|---|---|---|---|---|---|
| Locked Two | 1 | Float | Two | 0 | 1 |
| Locked Two | 1 | 0 | Two | 0 | 1 |
| Locked Two | 1 | 1 | Two | 0 | 0 |
| Locked Two | 0 | Float | Two | 1 | 1 |
| Locked Two | 0 | 0 | Two | 1 | 1 |
| Locked Two | 0 | 1 | Two | 1 | 0 |
| Locked Two | Float | Float | Two | 1 | 1 |
| Locked Two | Float | 0 | Two | 1 | 1 |
| Locked Two | Float | 1 | Two | 1 | 0 |

Figure 2:
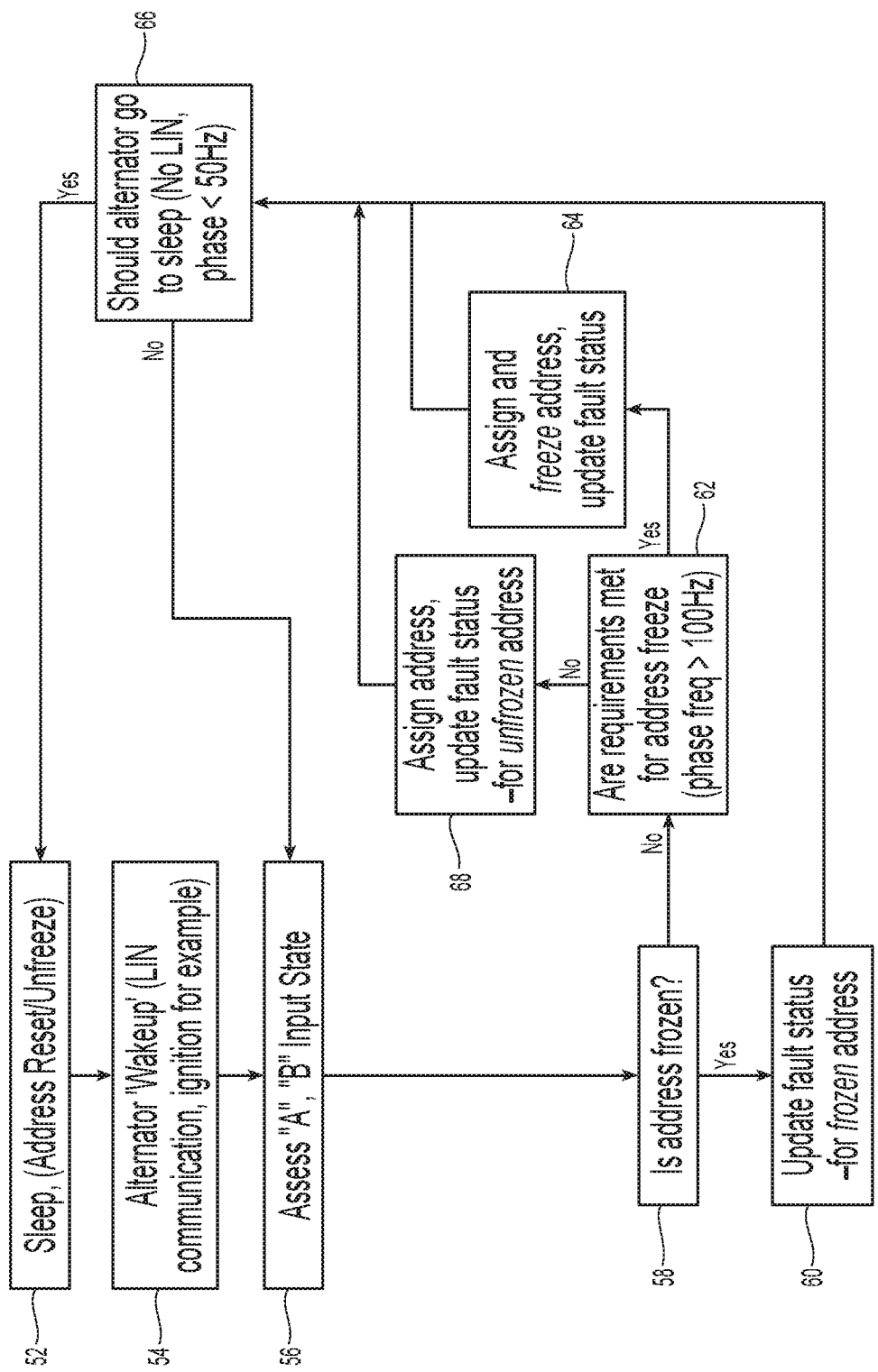
FIG. 2 is a flow chart illustrating a method of freezing an alternator address.

The process by which an address is assigned to each alternator and that address is then frozen or locked in vehicle 20 is best understood with reference to the flow chart depicted in FIG. 2. The process depicted in FIG. 2 runs separately and independently for each of the plurality of alternators 24 and this figure depicts the process for an individual one of the alternators. Advantageously, the process is performed by an appropriately programmed processor mounted within or on the alternator 24 although it is also possible to use a vehicle mounted processor located remote from the alternator.

Block 52 represents the condition where the alternator is in an inactive sleep mode. The movement to block 54 represents when the process is first initiated and corresponds to when the vehicle is initially started or when, during operation of the vehicle, the alternator is being awakened from a sleep mode. Upon receipt of a LIN communication from processor 46 to wake-up or a signal indicating that the ignition is in the start position or an RPM or other operating parameter threshold has been exceeded, the alternator wakes up and enters an active mode as represented by block 54.

After entering the active mode, the alternator determines the status of the input signals at connectors A and B as represented by block 56. The alternator then assesses whether the address of the alternator is locked/frozen or unlocked/unfrozen as depicted by block 58. Because the address of the alternator is unfrozen when it enters the sleep mode, the address of the alternator will be unfrozen for the first cycle after waking up and entering the active mode.

If the address is unfrozen, the process will proceed to block 62. If the address of the alternator has already been frozen, the alternator will proceed to block 60. At block 60, the alternator will determine the fault status of the A and B connectors based upon the frozen address of the alternator and report this information in a message to processor 46. The process would then proceed to block 66.

If the address is unfrozen and the process proceeds to block 62, the status of at least one operating parameter will be assessed to determine if a predefined requirement is satisfied for freezing the address. In the illustrated embodiment, the predefined requirement is that the frequency of the phase voltage generated by the alternator be greater than 100 Hz. The frequency of the phase voltage generated by the alternator varies with the rotational speed of the alternator (also referred to herein as the speed of the alternator). Thus, the frequency is an indirect measurement of alternator speed. The threshold frequency which must be satisfied can be set at a level that corresponds to the alternator being at or above a normal operating speed which, in turn, corresponds to the combustion engine operating at or above a normal operating speed.

While the predefined requirement that must be satisfied may be only an individual condition, such as the frequency of the phase voltage being generated by the alternator, it may alternatively require a plurality of conditions be satisfied. For example, the predefined requirement might additionally require that the ignition switch be in the "on" position.

In this regard, it is noted that it will generally be undesirable to freeze the address of the alternator when the ignition is in the start position and the starter is drawing current from the battery to start the engine. When the starter is drawing current to start the engine, a voltage drop may occur due to the current draw of the starter and, thus, might create an artificially low voltage on a line that is connected to an A or B connector and is intended to have a high voltage signal. This could result in a connector receiving a low voltage signal during engine starting when it normally receives a high voltage signal during operation of the vehicle.

It is also noted that while the illustrated example relies upon the frequency of the current being generated by the alternator to indirectly assess the alternator speed, other methods of measuring alternator speed could alternatively be used. For example, a resolver could be used to more directly measure the rotational speed of the alternator and a predefined rotational speed could be used as the predefined requirement or one of the conditions for the predefined requirement for freezing the alternator address.

In still other embodiments, additional conditions could be used instead of, or, in addition to the alternator speed. For example, the predefined requirement may require that the voltage generated by the alternator remain within a predefined range for a predefined time period. The threshold voltages and time period can be set so that this condition corresponds to normal operation of the vehicle and prevents the address from being frozen during starting of the engine when the current generated by the alternator may spike and drop significantly compared to normal operating conditions. Alternative vehicle operating parameters could also be used to ensure that the address is frozen when the vehicle is in a normal operating state.

If the predefined requirements of block 62 are satisfied, the process proceeds to block 64 where the input status of connectors A and B are assessed and used to assign an address to the alternator. This address is then frozen and the fault status of the A and B connectors is assessed and communicated to processor 46. The process then proceeds to block 66.

If the predefined requirements of block 62 are not satisfied the process proceeds to block 68 instead of block 64. At block 68, the alternator assigns an address to itself based upon the input signals at the A and B connectors and then determines the fault status of the A and B connectors. The address is not frozen but is flagged as unfrozen/unlocked.

It is noted that at blocks 60 and 64, the alternator determines whether the A and B connectors are receiving signals in agreement with the frozen address of the alternator and determines the fault status of the connectors in the manner depicted by Table 3. At block 68, an unfrozen address is assigned to the alternator and the fault status of the A and B connectors is determined in accordance with Table 2.

Returning now to a discussion of the flow chart in FIG. 2, it is noted that the process proceeds to block 66 after each of blocks 60, 64 and 68. At block 66, the alternator determines if it should remain in the active/awake mode or it should enter the sleep mode. In the illustrated embodiment, two conditions must be met before the alternator will enter the sleep mode. There must have been no communication from processor 46 within a predefined time period and the current being generated by the alternator must be below a threshold frequency (e.g., 50 Hz in the illustrated example). Both of these conditions are indicative of the engine being stopped. During normal operation, processor 46 will continually send message requesting the status of the alternators and if no such messages are received within the normal time frame, it is indicative of the vehicle being turned off. As discussed above, the frequency of the phase voltage is directly related to the alternator speed and when the engine is being stopped its speed will decrease, resulting in a slower rotational speed for the alternators. As a result, the frequency of the phase voltage will also drop. The threshold frequency at block 66 can be set below the frequency that would result from the engine being at an idle speed and thereby indicative of the engine slowing to a stop.

If the conditions for entering the sleep mode are not met, the process will return to block 56 where the alternator will once again perform a cycle of assessing the input signals at connectors A and B. As can be seen in FIG. 2, once the alternator has a frozen address, it will continue to cycle through blocks 56, 60, and 66 to update and report the fault status of connectors A and B and determine whether or not the alternator should enter the sleep mode. As can also be seen in FIG. 2, the alternator will continue to return to block 62 and determine if the predefined conditions for freezing the alternator address are satisfied until the alternator freezes its address.

If, at block 66, the conditions for entering the sleep mode are satisfied, the process will proceed to block 52. At block 52, the alternator will unfreeze and clear the address currently assigned to the alternator and then enter the sleep mode.

While this invention has been described as having an exemplary design, the present invention may be further modified within the spirit and scope of this disclosure. This application is therefore intended to cover any variations, uses, or adaptations of the invention using its general principles.

What is claimed is:

1. A vehicle charging system for use with a vehicle having an internal combustion engine, the system comprising:
   a plurality of alternators, each of the alternators being operably coupled with the engine and the electrical system wherein each of the alternators are operable to convert mechanical energy from the engine to electrical current which is output to the vehicle charging system; each of the plurality of alternators having a common electrical connection interface that includes at least one connector and a digital communication connection;
   a processor being operably coupled with the plurality of alternators through a communication line operably coupled with the digital communication connection of each of the plurality of alternators;
   the at least one connector of each of the plurality of alternators being operably coupled with the vehicle wherein input signals for each of the at least one connector for each of the plurality of alternators are unique for each one of the plurality of alternators under normal and unimpaired operating conditions whereby a unique address is assignable to each of the plurality of alternators based upon the status of the input signals received by the plurality of alternators on the at least one connectors;
   at least one sensor operably coupled with the vehicle for sensing at least one operating parameter of the vehicle; and
   wherein the processor and the plurality of alternators are configured such that upon wakeup of an alternator, the alternator assesses the status of the input signals from the at least one connector and whether the address of the alternator is frozen; when the address of the alternator is not frozen upon wakeup, the status of the at least one operating parameter is assessed to determine whether a predefined requirement is satisfied, when the predefined requirement is satisfied, the alternator is assigned an address based upon the input signals at the at least one connector and the address is frozen.

2. The vehicle charging system of claim 1 wherein each of the alternators has a common design.

3. The vehicle charging system of claim 1 wherein the at least one operating parameter includes a parameter that varies with the rotational speed of alternator.

4. The vehicle charging system of claim 3 wherein the at least one operating parameter that varies with the rotational speed of the alternator is the frequency of the phase voltage generated by the alternator.

5. The vehicle charging system of claim 1 wherein the vehicle includes an ignition switch having at least three positions that include an off position, a start position and an on position and wherein the predefined requirement requires that the ignition switch be in the on position.

6. The vehicle charging system of claim 1 wherein the predefined requirement requires that the voltage generated by the alternator remain within a predefined range for a predefined time period.

7. The vehicle charging system of claim 6 wherein the vehicle includes an ignition switch having at least three positions that include an off position, a start position and an on position and wherein the predefined requirement requires that the ignition switch be in the on position.

8. The vehicle charging system of claim 1 wherein one of the connectors of at least one alternator is in communication with a line extending between the at least one alternator and a vehicle battery.

9. The vehicle charging system of claim 1 wherein one of the connectors of at least one of the alternators is operably coupled with a line extending between the at least one alternator and a vehicle ground.

10. The vehicle charging system of claim 1 wherein the at least one connector of each of the alternators includes at least a first connector and a second connector.

11. The vehicle charging system of claim 10 wherein one of the first and second connectors of at least one alternator is in communication with a line extending between the at least one alternator and a vehicle battery; and one of the first and second connectors of at least one of the alternators is operably coupled with a line extending between the at least one alternator and a vehicle ground.

12. The vehicle charging system of claim 1 wherein the processor and the plurality of alternators are configured such that, when assessment of the status of the at least one operating parameter determines that the predefined requirement is not satisfied, the alternator is assigned an unfrozen address based upon the input signals at the at least one connector and then continues to repeat the process for assessing the status of the at least one operating parameter and assigning either a frozen or unfrozen address to the alternator until the alternator is assigned a frozen address or the alternator enters a sleep condition.

13. The vehicle charging system of claim 12 wherein, when the address of the alternator is frozen, the alternator periodically determines the fault status of the at least one connector by determining whether the at least one connector is receiving signals in agreement with the frozen address of the alternator and communicating the fault status of the at least one connector to the processor.

14. The vehicle charging system of claim 1 wherein, when the address of the alternator is frozen, the alternator periodically determines the fault status of the at least one connector by determining whether the at least one connector is receiving signals in agreement with the frozen address of the alternator.

15. The vehicle charging system of claim 14 wherein the alternator periodically communicates the fault status of the at least one connector to the processor when the alternator has a frozen address.

* * * * *